United States Patent [19]

Machado et al.

[11] Patent Number: 4,820,472

[45] Date of Patent: Apr. 11, 1989

[54] NUCLEAR REACTOR SPENT FUEL STORAGE RACK

[75] Inventors: Octavio J. Machado; William M. Flynn; Harry E. Flanders, Jr.; Larry W. Booker, all of Pensacola, Fla.

[73] Assignee: Westinghouse Electric Corp., Pittsburgh, Pa.

[21] Appl. No.: 282,991

[22] Filed: Jul. 14, 1981

[51] Int. Cl.[4] .............................................. G21C 19/40
[52] U.S. Cl. .................................................... 376/272
[58] Field of Search ....................... 376/272, 462, 448; 294/86 A, 81 SF

[56] References Cited

U.S. PATENT DOCUMENTS

| | | | |
|---|---|---|---|
| 3,533,911 | 10/1970 | Fortescue et al. | 376/272 |
| 3,882,313 | 5/1975 | Siemens | 376/272 |
| 4,006,362 | 2/1977 | Mollon et al. | 376/272 |
| 4,010,375 | 3/1977 | Wachter et al. | 376/272 |
| 4,021,300 | 5/1977 | Marshall | 376/462 |
| 4,024,406 | 5/1977 | Bevilacqua | 376/272 |
| 4,034,227 | 7/1977 | Soot | 376/272 |
| 4,039,842 | 8/1977 | Mollon | 376/272 |
| 4,042,828 | 8/1977 | Rubinstein et al. | 376/272 |
| 4,068,878 | 1/1978 | Witner | 294/81 SF X |
| 4,088,897 | 5/1978 | Soot | 376/272 |
| 4,096,392 | 6/1978 | Rubinstein et al. | 376/272 |
| 4,119,859 | 10/1978 | Karzmar et al. | 376/272 |
| 4,124,445 | 11/1978 | Mollon | 376/272 |
| 4,137,125 | 1/1979 | Walters | 376/462 X |
| 4,139,228 | 2/1979 | Varadi | 294/81 SF X |
| 4,143,276 | 3/1979 | Mollon | 376/272 |
| 4,177,385 | 12/1979 | Bevilacqua | 376/272 |
| 4,177,386 | 12/1979 | Wachter et al. | 376/272 |
| 4,187,433 | 2/1980 | Zezza | 376/272 |
| 4,203,038 | 5/1980 | Takahashi et al. | 376/272 |
| 4,233,518 | 11/1980 | Auyeung et al. | 376/272 |
| 4,243,889 | 1/1981 | Weber | 376/272 |
| 4,248,668 | 2/1981 | Dixon et al. | 376/272 |
| 4,268,356 | 5/1981 | Kmonk et al. | 376/462 |
| 4,306,938 | 12/1981 | Yamanaka | 376/448 |
| 4,317,702 | 3/1982 | Akeret | 376/272 |
| 4,356,062 | 10/1982 | Bosshard | 376/272 |
| 4,567,015 | 1/1986 | Bosshard | 376/272 |
| 4,710,342 | 12/1987 | Helary et al. | 376/272 |
| 4,746,487 | 5/1988 | Wachter | 376/272 |

FOREIGN PATENT DOCUMENTS

2742736  4/1979  Fed. Rep. of Germany ...... 376/272
2462767  2/1981  France .

*Primary Examiner*—Stephen C. Bentley
*Assistant Examiner*—Daniel Wasil

[57] ABSTRACT

Spent fuel racks for housing new or spent fuel assemblies at a nuclear reactor site. The racks are made to modular design and include upper and lower grid structures which provide aligned square openings. A container or cell shaped to the size of a fuel assembly fits in each of the aligned square openings. To provide verticality to the aligned and uniformly spaced cells, leveling pads beneath the base plate supporting the cells are adjustable vertically to cause the base plate to assume a horizontal plane and thereby align cell longitudinal axis with a vertical plane.

23 Claims, 6 Drawing Sheets

NUCLEAR REACTOR SPENT FUEL STORAGE RACK

BACKGROUND OF THE INVENTION

The invention described herein relates to the safe storage of either new or spent nuclear reactor fuel assemblies and more particularly to an improved design of spent fuel racks capable of substantially increasing the storage capacity of on-site spent fuel storage pools The continued delays in establishing and licensing spent nuclear fuel reprocessing facilities has required electric power generating utilities to better utilize their present spent fuel storage pools to maximize the storage of spent fuel assemblies removed from an operating reactor. storage capacity of on-site spent fuel storage pools.

The continued delays in establishing and licensing spent nuclear fuel reprocessing facilities has required electric power generating utilities to better utilize their present spent fuel storage pools to maximize the storage of spent fuel assemblies removed from an operating reactor. To increase the storage density of fuel assemblies, stainless steel containers or cells which house separate fuel assemblies are used to achieve reduction in fuel assembly spacing in the pool. Alternatively, the spacing can be reduced to a further degree by incorporating neutron absorbing substances, such as boron carbide in the cell walls at the time of manufacture, or by attaching neutron absorbing materials to the sides of the cell as separate components. These constructions which permit closer spacing of adjacent fuel assemblies, effectively capture neutrons and keep the fissionable mass in the fuel assemblies from reaching a critical geometry while maintaining the pool temperature at acceptable levels.

Prior designs of spent fuel racks which employ the foregoing constructions to reduce spacing between either new or spent assemblies, often include a network of channel beams connected in a square array to form multiple square openings which receive the containers or cells which house fuel assemblies. The cells are welded to each other or to the channel beams to provide rigidity to the structure and to space adjacent cells designed to receive spent fuel assemblies. A number of fuel assembly cells connected together in this manner form modules which are interconnected and braced to the pool walls thus providing stability against horizontal seismic loadings. Such bracing in conjunction with various types of structural supports at the pool floor interface have resulted in installation difficulties and potential rack displacement from a non-critical design pattern to new positions which may not meet Nuclear Regulatory Commission design criteria for spent fuel pools.

Further since the cells and fuel assemblies are submerged in water, constructions incorporating neutron absorbing substances must utilize materials which are compatible with the pool environment or provide total encapsulation of the material. Some earlier designs of the latter type have experienced swelling of the poison cavities.

SUMMARY OF THE INVENTION

Briefly stated to overcome the above disadvantages, the assembled fuel rack module includes multiple cells which are welded to upper and lower box beams to impart rigidity to the construction. The welding means includes projections which extend from the cell walls a sufficient distance into the inter-cell space to protect neutron absorbing material mounted on the cell walls when they are lowered vertically into position.

The neutron absorbing material mounted on the cell walls is structurally supported by stainless steel wrapper sheets which permit venting to the pool environment and are provided with orifices to allow for visual verification of installed poison materials.

The fuel rack modules can be totally free standing without interconnections, wall bracing, or separate lower support structures. Leveling pads are located at various places beneath the module base structure to provide a level floor. The pads seat on the liner floor and include radially spaced arms which contact and provide support to the complete module. To accommodate unevenness in the pool floor, the pads incorporate structural features which permit the axis of support arms to be moved relative to the module base structure and provide perpendicularity between the module surface on which fuel assemblies sit and the arms which lend support to the structure. Since the supports are adjustable vertically, the base structure on which the module sits can be adjusted in a horizontal plane to provide cells having all their axes truly perpendicular to the base, thus providing for uniform spacing and disposition of fuel assembly cells in the pool.

BRIEF DESCRIPTION OF THE DRAWINGS

While the foregoing discussion identifies problems presently existing in the prior art together with a general description of how they may be overcome, it is believed the following disclosure of the preferred embodiment will be better understood by reference to the accompanying drawings wherein.

DESCRIPTION OF THE PREFERRED EMBODIMENT

Figure 1:
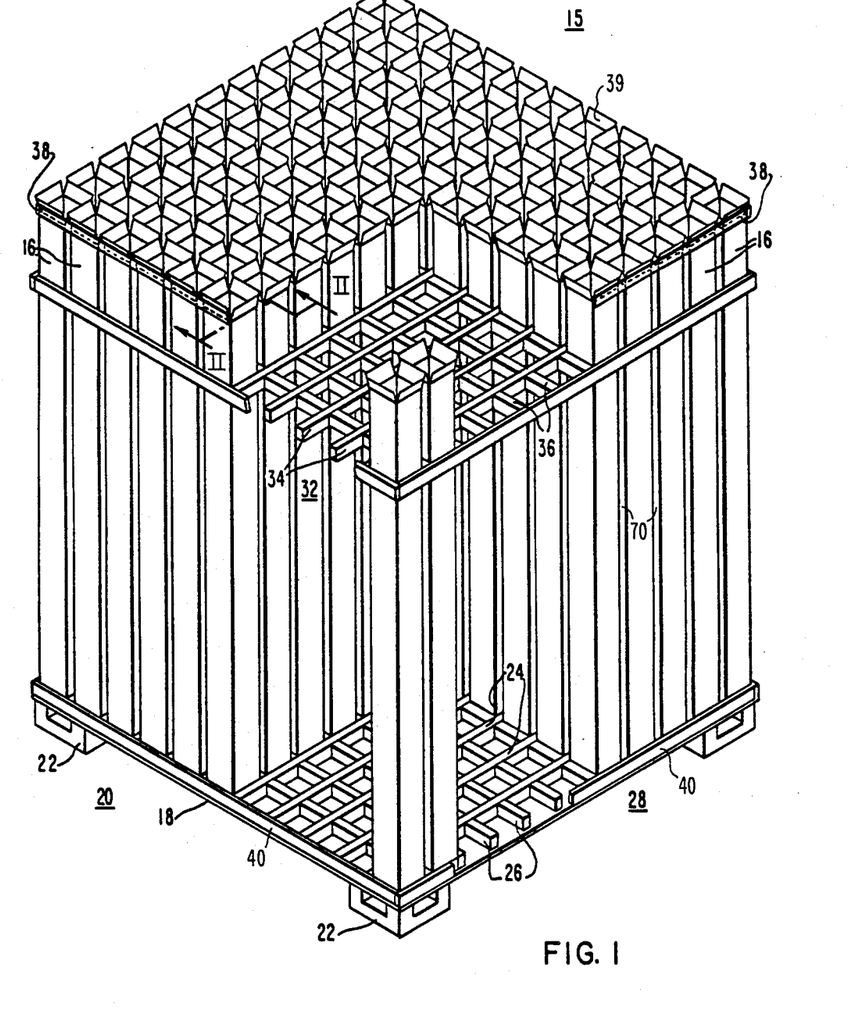
FIG. 1 is an isometric view of a spent fuel rack module showing the disposition of cells which house fuel assemblies.
Figure 2:
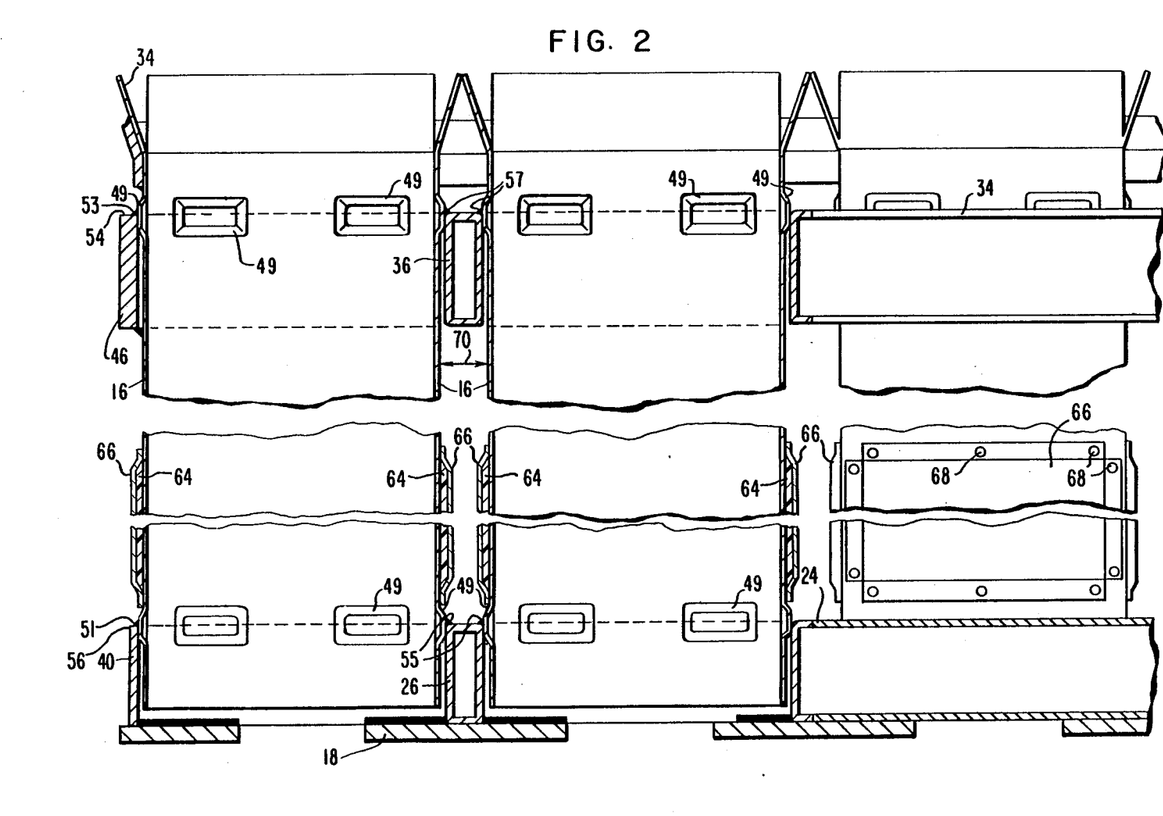
FIG. 2 is a view taken on lines II—II of FIG. 1 illustrating the arrangement for spacing adjacent fuel assembly cells and showing how neutron absorbing material is attached to the cell walls.

Referring now to the drawings wherein like reference characters designate like or corresponding parts through the several views, there is shown in FIGS. 1 and 2 a spent fuel rack module 15 which consists of an array of containers or cells 16 each of a size and configuration for holding a nuclear fuel assembly (not shown). An 11×11 array is shown but any number of cells, including a rectangular array may be used depending on the design and configuration of the pool. The fuel assembly may be either a fresh or spent fuel assembly since both are of the same size and the fuel racks must be designed to meet Nuclear Regulatory Commission criteria for storage of spent or new nuclear fuel. The fuel racks are of modular design and the module shown in FIGS. 1 and 2, is one of many arranged to be located in a spent fuel storage pool at the site of a nuclear reactor. Although storage pools vary in size, they generally range in depth from about 20 to 40 feet and hold anywhere from two hundred to about sixteen hundred fuel assemblies. The pool walls are formed of reinforced concrete and are particularly designed in accordance with NRC specifications to withstand seismic forces. To remove heat which continues to be generated by the fuel assemblies, water or other coolant is circulated in heat exchange relationship with fuel rods in the assemblies in a manner well known in the art.

The spent fuel rack module shown includes a support including a base structure 18 arranged to be supported from the pool liner 20 (FIGS. 9, 10, 11) by leveling pads 22. The base structure of stainless steel is of sufficient thickness to carry the full weight of the cells 16 and fuel assemblies without distorting and still maintain vertical alignment of the cells positioned thereon.

Figure 4:
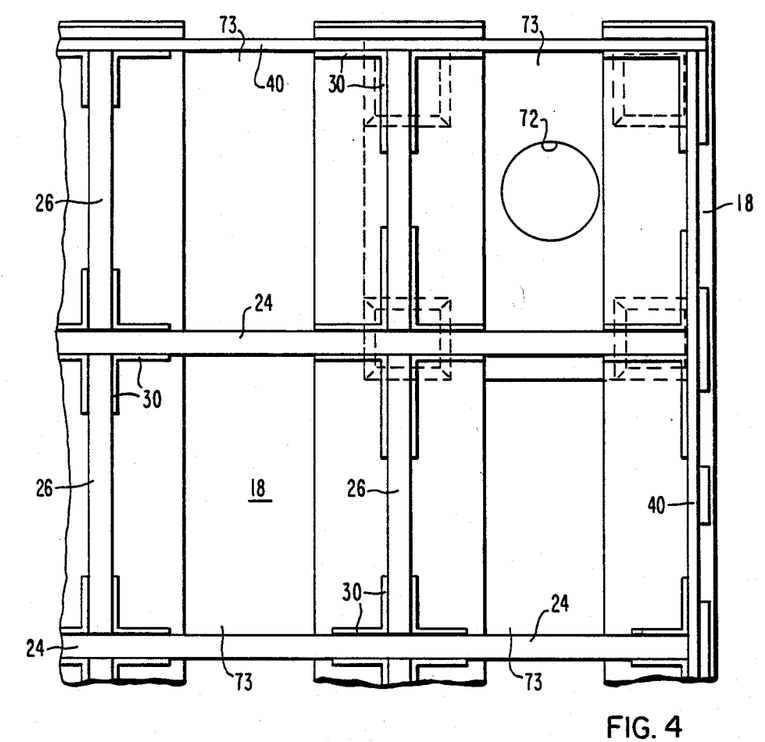
FIG. 4 is a fragmental plan view of one end of the base plate showing box beams and the design for providing base structure support by leveling pads; the leveling pad shown with the leveling screw omitted.

To achieve the desired horizontal spacing and vertical alignment of cells 16, multiple X-axis box beams 24 and Y-axis box beams 26 are mounted on and welded to base structure 18 to form lower grid 28. As shown in FIG. 1, X-axis box beams 24 extend unbroken from one end across base structure 18 to the other side of the module, while x-axis beams 26 include short sections which extend between and are welded to the unbroken parallel beams 24. FIG. 4 illustrates the location and extent of welds 30 made at the intersection of X-axis and Y-axis beams and the base plate 18. An upper grid structure 32 vertically displaced from lower grid 28, is constructed of similar X-axis and Y-axis box beams 34, 36.

Figure 3:
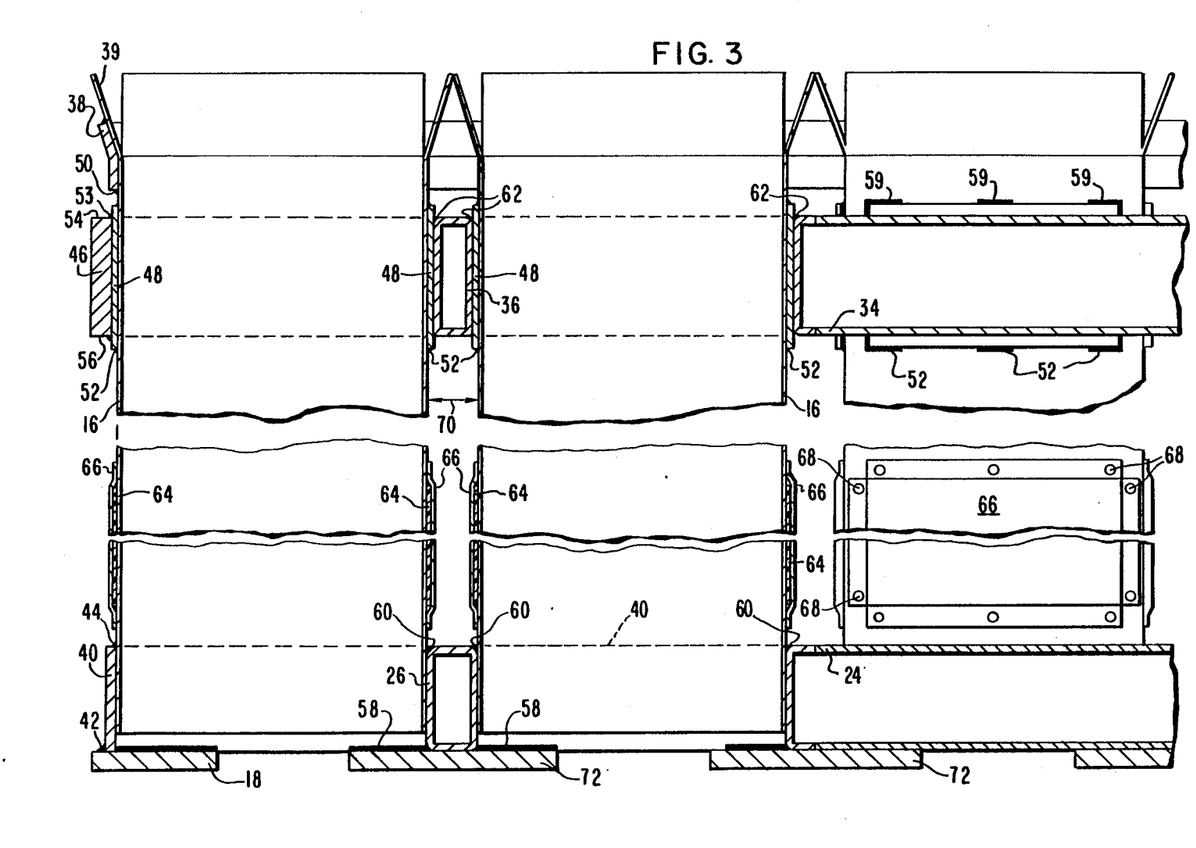
FIG. 3 is a modification of the design shown in FIG. 2.

This interlocking arrangement of box beams in both lower and upper grid structures form multiple openings of square configuration aligned vertically to receive the stainless steel cells 16. The cells have walls approximately 0.10-inch thick and are open at both ends. Although the cells may be made of any size or configuration, the design chosen to illustrate this invention has an inner dimension of 8.75 inches in length and width directions and is approximately 14 feet high. the bottom end of each cell welds to lower grid structure 28. The base structure 18 under the grid structure 28 is equipped with openings between its plates 120 through which coolant is adapted to flow upwardly through the fuel assemblies to carry away generated heat (FIGS. 2 and 3).

To impart reasonable rigidity to the complete module and to maintain the same uniform distance between all cells in the module while obtaining parallelism between cell centerlines, each cell is fixedly secured by welding on all sides to adjacent box beams in both the lower and upper grid structures as more fully described hereafter. FIGS. 1, 2 and 3 show a lower side plate 40 which extends completely around the module and is attached to be plate structure 18 by welds 42 (shown in FIG. 3), and includes in the FIG. 3 modification only a weld 44 between the side plate and cell walls. These welds run along the base structure length and along the sides of the peripheral cells in the module. This arrangement imparts strength and rigidity to the lower outside areas of the module.

Likewise, the upper part of the module includes an upper side plate 46 which encompasses the complete module and is welded to each cell on the module periphery. Both peripheral plates 40, 46 encompass the cell module at low and high elevations to accurately define the module outer limits and to help impart squareness and strength to the complete module. The plates 40 in the FIG. 2 modification and 46 in both the FIG. 2 and FIG. 3 modifications which surround the module are welded respectively at 51, 53 along their top edges 54, 56 (FIG. 2) to the dimples 49 on the cell walls which face outwardly from the module.

As illustrated in the preferred embodiment of the invention in FIG. 2, the dimples 49 are formed in the walls of each cell at an elevation near the top of box beams 34, 36, 24, 26. These dimples may be of the design shown, or of other configuration, such as a continuous deformation of the cell wall, which projects outwardly a distance at least equal to the thickness of neutron absorbing material 64 and wrapper plates 66. Welds 51, 53 are made at the interface of the dimples and lower and upper side plates 40, 46, while welds 55, 57 are made between box beams 24, 26 and 34, 36 and dimples 49.

In the alternative design of FIG. 3, in lieu of using dimples which project into the inter-cell space at both the bottom and top of the module, plates 48 are welded at 52, 130 to the cell surface but only near the upper end of cells 16. The space between cells on box X and Y axes near the base plate 18 is occupied by box beams 24, 26 of slightly larger size than box beams 34, 36 located thereabove. Welds 60 secure the lower box beams to the sides of cells 16 while welds 62 secure the upper box beams to the surface of plate 48.

In both modifications which utilize dimples and protective plates 48 to which the side plates 46 and box beams are welded, the depth of dimple and protective plate thickness respectively is chosen or made to a greater dimension than the combined thickness of the neutron absorbing material 64 and wrapper plate 66. The protective plates or dimples will therefore extend into the inter-cell space for a distance greater than the combined depth of neutron material and wrapper plate in order to protect the latter when the cells are installed in the network of lower and upper box beams which comprise the basic structure of the spent fuel racks.

FIG. 1 shows how the bottom end of cells 16 snugly fit in the aligned square openings formed by the lower and upper grid assemblies 28, 32. As shown in FIG. 3, welds 58 attach the bottom edges of box beams 24, 26 to the plates 120 of the base structure 18 while welds 60 secures the upper edges of the box beams to the lower sides of cells 16. The box beams 34, 36 in the upper grid structure are welded at 62 along their upper edges to the protective plates 48 attached to all four sides of each cell. By welding both the beams and upper grid structures to the cell surfaces in this manner, a strong relatively rigid module is formed which not only will provide parallelism and vertical alignment between all cells but will also accommodate seismic disturbances.

In order to assure that fuel stored in the cells will not reach a critical mass, neutron absorbing material 64 mounted on the cell surface together with the space between cells which is occupied by water, or borated water, will effectively minimize neutron activity. The cross-sectional views in FIGS. 2 and 3 of a cell shows that the neutron absorbing material, preferably "Boraflex" which is boron carbide in an elastomeric silicon polymer matrix manufactured by Brand Industrial Services, Inc., of Park Ridge, Ill., is attached to all sides of each cell. Other equivalent materials may be used if desired. As shown in FIGS. 2 and 3, the material 64 may be in the form of sheets of material which cover substantially the full surface area of the cell walls but terminates just short of the sides and the top and bottom grid structures. A wrapper plate 66 of a size slightly larger than the material is welded to the sides of the cell by tack welds 68 to retain the neutron absorbing material. Water tightness is not essential since the neutron absorbing materials used is not adversely affected by contact with the pool environment. The total thickness of material 64 and wrapper plate 66 is less than the thickness of the dimples 49 (FIG. 2) or protective plate 48 (FIG. 3), the purpose being that when the cells are loaded into or removed from the module, the greater thickness of dimple 49 or protective plate 48 will permit that part of the cell having the wrapper plates thereon to pass freely through the upper grid structure without damaging the wrapper plates and material 64 surfaces.

One Nuclear Regulatory Commission requirement for spent fuel racks is that they must withstand seismic forces. In the present invention, this is accomplished by utilizing the interconnected box beam and side plate arrangements described above. Since the upper and lower grid structures 32, 28 are welded to the cells in the manner shown, they impart substantial rigidity to the complete fuel rack module and thus meet the NRC seismic criteria. In those geographical areas where seismic activity is relatively high, additional rigidity may be incorporated in the module by welding shear plates 45 which extend substantially the complete height of the module, to adjacent cells around the complete periphery of the module. These shear panels may be welded at selected points along their length or along the complete length as desired.

The foregoing discussion indicates the need to have the center line; i.e., the longitudinal axis, of each fuel assembly cell perpendicular to the base plate on which the cells are arranged to be positioned. In the present invention, leveling of the base plate 18 is accomplished by utilizing leveling pads 22 more fully described hereafter, positioned under base structure 18 at each of the corners of the module, and beneath the selected section of base structure 18, depending on the loads carried by the base plate.

Each cell in the module is of square cross-section and of a size to fit into the complementary and vertically aligned square openings formed by the lower and upper grid structures 28, 32. As more clearly shown in FIGS. 1 and 2, the cell upper walls have funnel cell flanges 39 which flare outwardly to help guide a fuel assembly into the cell during the loading process. The upper ends terminate just above the upper grid 32 and a brace 38 (FIG. 1) shaped to the same configuration as the flared sections, is welded to the outer wall of the peripheral cells in the module. The brace serves a support function and helps keep the cells in proper alignment.

Additional rigidity may be imparted to the structure by welding the shear plates mentioned above to adjacent cells 16 having their surfaces on the modular periphery. Each plate is of a width sufficient to bridge the gap 70 between adjacent cells and thereby overlap the cell walls which face outwardly. Preferably, the longitudinal edges of the shear plates terminate short of wrapper plate 66 and the vertical edges on each end of the shear plates are then welded to the cell walls. This construction is repeated on adjacent cells in the outer rows in the module to provide a degree of rigidity to the complete module and, if necessary, help meet NRC seismic criteria for spent fuel racks.

It is essential that the spaced cells comprising the fuel rack have the cell walls aligned vertically to help assure unimpeded loading and removal of fuel assemblies from the fuel rack cells. This is accomplished in the apparatus disclosed herein by providing adjustability to the base structure 18 on which the fuel assemblies rest.

The pool liners rarely are exactly flat and level and leveling means is therefore necessary to adjust base structure 18 to a horizontal condition. FIGS. 4 through 11 show the structure needed for leveling purposes. FIG. 4 is a plan view of a portion of base structure 18 and shows the box beams 24, 26 welded to its upper surface. There are openings 73 between the plates 100 of the base structure 18 through which coolant flows upwardly for cooling the fuel assemblies and for providing access to leveling pads located therebeneath.

Figure 5:
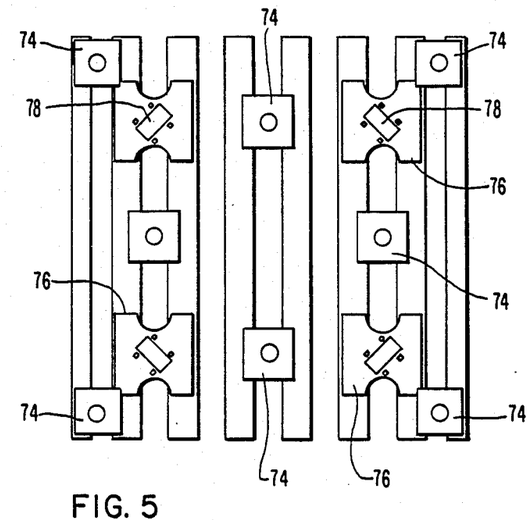
FIG. 5 is a bottom view of the base structure showing the location of support plates, with the leveling screws omitted for clarity, attached to the underside of the base structure.
Figure 6:
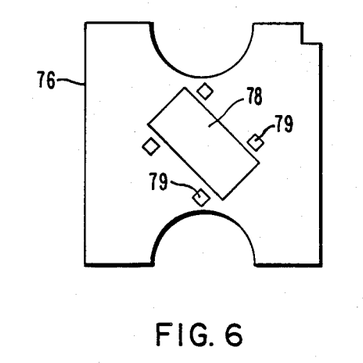
FIG. 6 illustrates a lifting support plate shown in FIG. 5.
Figure 7:
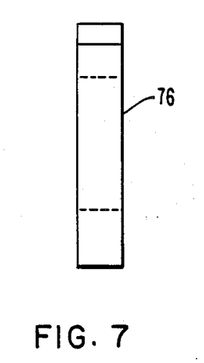
FIG. 7 is a side view of the plate of FIG. 6.
Figure 8:
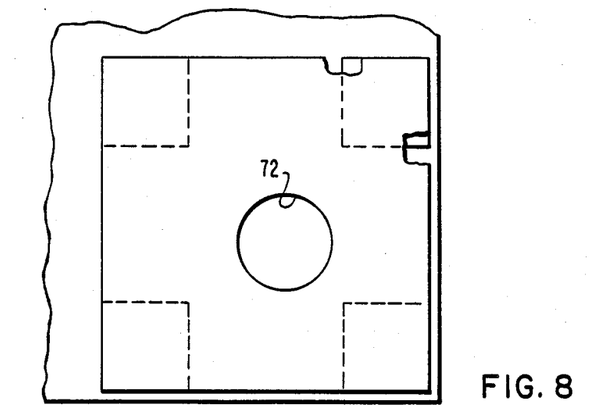
FIG. 8 is a fragmental view showing a leveling pad with the leveling screw omitted for clarity used for supporting the base structure.

FIG. 5 shows leveling pad 22 located at the four corners of the base structure 18 and at selected other positions beneath the base structure as necessary to adequately support the load on the upper surface of the base structure. FIGS. 5–7 show lifting plates 76 welded to the underside of the base structure 18 for module lifting purposes. The lifting plates are about 1" thick and have rectangular openings 78 which extend upwardly through the base structure 18. Multiple stop bars 79 at each corner of opening 78 extend downwardly from the plate underside so that when a lifting lug is moved downwardly through rectangular opening 78 and rotated 90° to enable lifting upwardly on the underside of the plate, the stop bars serve to preclude inadvertent movement of the lug to a position where it could slip upwardly through the plate opening.

Figure 9:
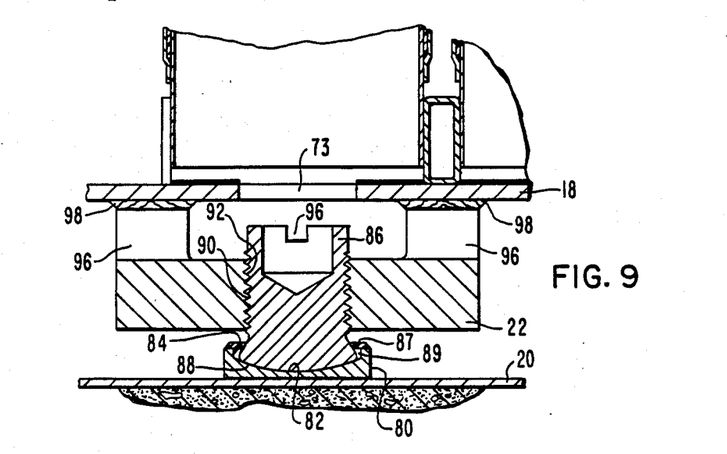
FIG. 9 is a sectional view in elevation illustrating a leveling pad used for imparting support to the base structure.

Referring more specifically to the arrangement for leveling base structure 18, FIG. 9 shows a pool liner 20 having a pedestal 80 mounted for free unrestricted movement on the pool liner surface. The pedestal includes an accurate surface 82 which merges into upstanding cylindrical walls 84. A leveling screw 86 having a spherical surface 88 formed on its bottom end is complementary to pedestal surface 82. After the end of leveling screw 86 is placed in the pedestal, a circular plate 87 is welded to the walls 84 thus leaving a space 89 into which the end of the screw may move if necessary for leveling purposes. External threads 90 on the screw mesh with similar threads 92 on a support pad 22 so that when the screw is rotated by a tool in slot 96, the support pad is caused to be moved vertically. The support pad 22 includes four radially spaced support arms 97 attached to the underside of base plate 18 by welds 98.

In operation, to adjust base structure 18 to a level condition, leveling pads 22 are located beneath base structure 18 corners and at selected positions under the base structure central area (see FIG. 5). To level the base structure and cells thereon, each pedestal 80 is moved in an amount and direction to have its bottom surface tilt or conform to the slope of the floor on which pool liner 20 rests. If the liner floor is uneven, the complementary spherical surfaces on the pedestal and leveling screw are adjusted to each other until the axis of leveling screw 86 lies in a vertical plane. By inserting a tool in slot 96 through opening 73 in the base structure and rotating the leveling screw, which then acts as a bearing, the support pad 22 will move vertically and thus raise or lower the base structure 18 to a desired position. This action is repeated for each corner and central area support pad until the base structure 18 is adjusted to a horizontal position.

Figure 10:
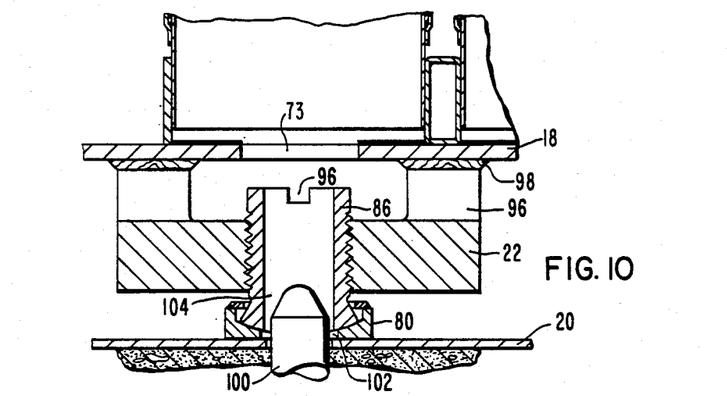
FIG. 10 is a sectional view in elevation showing a leveling pad used in spent fuel pits having alignment shear studs anchored in the pool floor.

The support pad of FIG. 10 is used in those spent fuel racks already in place which have shear studs 100 embedded in the pool floor. The leveling pad parts are otherwise the same and include a pedestal 80 modified to include a central opening 102 through which stud 100 projects. The diameter of opening 102 is sufficiently large to accommodate non-verticality in the stud 100 and variations in slope in the pool floor. Since the stud serves to maintain the position of a leveling pad in the pool floor area and subjected to shear only in the event of a large seismic disturbance, it is designed to a length to extend upwardly into the leveling screw 86 to a relatively short distance. As in the case of the pedestal opening, a space 104 is provided between the stud and leveling screw walls to provide flexibility in fitting the parts to each other. As a tool in slot 96 rotates the leveling screw, the coacting threads on the screw and support pad 22 cause the support pad and base structure 18 to move vertically until a horizontal position is reached.

Figure 11:
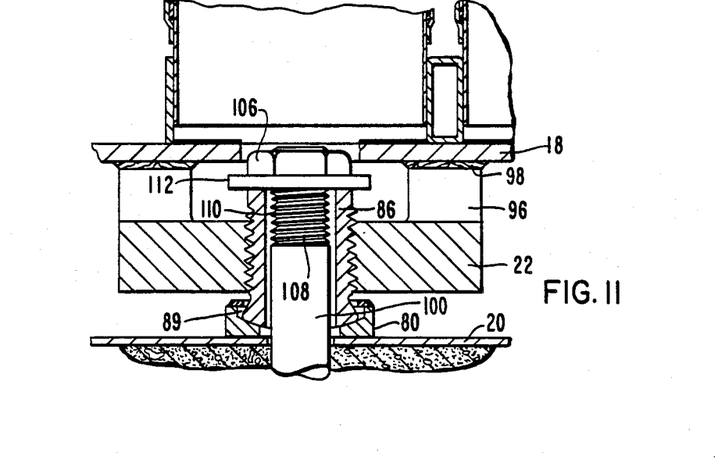
FIG. 11 is a sectional view in elevation showing a leveling pad used in alignment studs anchored in the pool floor and extending upwardly into the leveling pad.

The support pad of FIG. 11 is likewise used in those fuel rack installations where studs are already embedded in the pool floor. In this design, the stud 100 extends the full length of leveling screw 86 and is topped by a spherical anchor nut 106 and anchor washer 112 which restrains the rack vertically. The upper end of the stud has external threads 108 to accept the threads of nut 106. The spherical washer 112 bears between the upper end of leveling screw 86 and the nut to provide spherical surfaces which help to compensate for the potential misalignment of the stud embedded in the pool floor. As in the previous modifications, the pedestal seeks the floor slope and the spherical surfaces on the pedestal and leveling screw permit the leveling screw to lie in a vertical plane, all within the range of spaces 89 and 110 provided in the pedestal assembly. Adjustment of the support pad 22 vertically by the leveling screw 86 causes variation in the horizontal position of base structure 18.

It will be apparent that many modifications and variations are possible in light of the above teachings. It therefore is to be understood that within the scope of the appended claims, the invention may be practiced other than as specifically described.

We claim:

1. A fuel rack for storing nuclear fuel assemblies in a nuclear fuel-storage pool having a floor; the said fuel rack comprising:

a base structure at the lower end of the fuel rack including base-plate means having flow openings therein, said base-plate means supporting a first network of interlaced beams which form a multiplicity of polygonal openings;

a second network of interlaced beams vertically spaced from the first network forming polygonal openings positioned in spaced vertical alignment with corresponding polygonal openings in the first network of beams;

a plurality of cells, each cell having sides bounded by inner and outer surfaces and being of a size and configuration designed to hold therein a fuel assembly, each said cell being positioned in a corresponding pair of said aligned polygonal openings, each said cell being open at both ends with a guiding funnel at its upper end, and said cells being positioned over said flow openings in said base-plate means, thereby to permit flow of coolant through said cells;

spaced outwardly direction projections on said outer surfaces of the sides of said cells near the tops and bottoms of the sides thereof, each said cell together with said projections thereon being sized to be received within a corresponding said pair of aligned polygonal openings in which said each cell is positioned;

means fixedly securing said projections to the beams in the first and second networks of beams thereby to provide a substantially rigid fuel rack of modular design;

neutron absorbing material mounted on the outer surfaces of the sides of at least some of said cells between said spaced top and bottom projections, said neutron absorbing material having a thickness no greater than the outward extent of said projections; and leveling means for said base structure located between the fuel storage pool floor and said base structure for adjusting the base-plate means and cells thereon to a level condition.

2. The fuel rack according to claim 1 wherein the ends of said first and second beams are welded to peripheral side plates which extend around the fuel rack module.

3. The fuel rack according to claim 1 wherein said outwardly directed projections comprise plates welded to the sides of each cell near the top and bottom ends thereof, said plates being of a thickness greater than the neutron absorbing material to permit the loading of the cell with the material attached thereto into the aligned square openings.

4. The fuel rack according to claim 1 wherein said outwardly directed projections include dimples formed in the cell walls, and the means securing the dimples to said beams comprise a weld made in the intercell space so that the dimpled cell material serves to absorb impact loads of the stored fuel assembly on the cell wall, thereby reducing potential damage to both the fuel rack and stored fuel assembly during seismic events.

5. the fuel rack according to claim 4 wherein the dimples project into the space between adjacent cells a distance greater than the outward extent of the neutron absorbing material to protect the material when the cell is loaded into the aligned square openings.

6. The nuclear fuel rack according to claim 1 wherein said base plate leveling means includes multiple leveling pads beneath said plate;

each of said pads including a base member having vertically adjustable means therein arranged to engage the underside of said plate and thereby provide, upon adjustment, a horizontal surface to help assure vertical alignment of the cell walls.

7. The nuclear fuel rack according to claim 6 wherein said vertical adjustable means includes a frame having upstanding arms which engage the underside of said base plate, and an adjustable foot arranged to coact with said frame to vertically adjust the base plate to assure vertical alignment of the cell walls.

8. The nuclear fuel rack according to claim 7 wherein said frame has a central opening and the adjustable foot is screw threaded into said opening;

so that when the foot is adjusted vertically, the frame and frame arms move relative to the pool floor to achieve leveling of the plate to assure vertical alignment of the cell walls.

9. The nuclear fuel rack according to claim 8 wherein means associated with said foot acts to permit the foot center line to lie perpendicular to the base plate even though the floor of the pool on which the adjustable means rests is uneven.

10. The nuclear fuel rack according to claim 9 wherein said means associated with said foot includes a pedestal adapted to be positioned on the pool floor;

a spherical surface on said pedestal; and a complementary spherical surface on the bottom of said foot which engages the pedestal thus permitting the foot to move on said spherical surface relative to the pedestal and assume a vertical position when the pedestal rests on a non-horizontal surface.

11. The nuclear fuel rack according to claim 10 wherein the pedestal is permitted unrestricted movement on the pool floor.

12. The nuclear fuel rack according to claim 8 wherein the upper end of the adjustable foot is accessible through an opening in the base plate; and indentations on the upper end of said foot engageable by a tool which permits the foot to be adjusted to leveling positions.

13. The nuclear fuel rack according to claim 6 wherein leveling pads are positioned beneath the central area of said plate which supports the cells;

said leveling pad including a pedestal mounted on the pool floor;

a vertically adjustable foot having one end in said pedestal and the other end positioned for access through an opening in the base plate;

a plate support member having radially extending arms arranged to contact the underside of said base plate, said member having a central threaded opening into which said foot is threaded so that upon rotation of the foot in the pedestal, the support member is caused to move vertically and thus adjust the leveling position of the base plate to assure vertical alignment of the cell walls.

14. The nuclear fuel rack according to claim 1 wherein the neutron absorber material comprises sheet material which covers substantially the full surface area of each side of each cell; and means associated with each cell for providing a continuous structural support for said material.

15. A fuel rack for use in storing nuclear fuel assemblies in a nuclear fuel storage pool having a floor on which an upwardly projecting stud is mounted; the said fuel rack comprising:

a base structure at the lower end of the fuel rack including base-plate means having flow openings therein, said baseplate means supporting a first network of interlaced beams which form a multiplicity of polygonal openings;

a second network of interlaced beams forming polygonal openings positioned in spaced vertical alignment with corresponding polygonal openings in the first network of beams;

a plurality of cells, each cell having sides bounded by inner and outer surfaces and being of a size and configuration designed to hold therein a fuel assembly, each said cell being positioned in a corresponding pair of said aligned polygonal openings, each said cell being open at both ends with a guiding funnel at the upper end, and said cells being positioned over said flow openings in said base-plate means, thereby to permit flow of coolant through said cells;

spaced, outwardly directed, projections on said outer surfaces of the sides of said cells near the tops and bottoms of the sides thereof, each said cell together with said projections thereon being sized to be received within a corresponding of said pair of aligned polygonal openings in which said cells are respectively positioned; and means fixedly securing said projections to the beams in the first and second networks of beams thereby to provide a substantially rigid fuel rack of modular design;

neutron absorbing material mounted on the outer surfaces of the sides of at least some of said cells between said spaced top and bottom projections, said neutron absorbing material having a thickness no greater than the outward extent of said projections; and leveling means for said base structure, located between the fuel storage pool floor and said base structure, for adjusting the base-plate and the cells thereon to a level condition; said leveling means for the base structure including:

multiple leveling pads beneath said base structure, each of said pads including a base member having vertically adjustable means therein arranged to engage the underside of said base structure and thereby provide, upon adjustment, a horizontal surface to help ensure vertical alignment of the cells, said vertically adjustable means including a frame having upstanding arms which engage the underside of the base structure and an adjustable foot arranged to coact with said frame to adjust vertically the base structure to assure vertical alignment of the cell walls, said frame having a central opening and said adjustable foot being screw threaded into said opening so that when said foot is adjusted vertically, said frame and frame arms move relative to the pool floor to achieve leveling of the base structure and also to assure vertical alignment of the cell walls; the said nuclear fuel rack also including:

means, connected to the foot, actuable to permit the foot centerline to lie perpendicular to said base structure even though the floor of the pool on which said vertically adjustable means rests is uneven, said actuable means including:

a pedestal to be positioned on the pool floor, a spherical surface on said pedestal, and a complementary spherical surface on the bottom of said foot which engages the pedestal on the spherical surface thereof thus permitting the foot to move on said spherical surface of said pedestal relative to the pedestal and assume a vertical position when the pedestal rests on a non-horizontal surface;

said foot and said pedestal having coaxial openings to accommodate the upwardly projecting stud; and locking means on said foot and pedestal, cooperative with said stud, for locking said foot and pedestal in position on said floor.

16. A fuel rack for storing nuclear fuel assemblies in a nuclear fuel-storage pool having a floor; the said fuel rack comprising:

a base structure at the lower end of the fuel rack including base-plate means having flow openings therein, said base-plate means supporting a first network of interlaced beams which form a multiplicity of polygonal openings;

a second network of interlaced beams vertically spaced from the first network forming polygonal openings positioned in spaced vertical alignment with corresponding polygonal openings in the first network of beams;

a plurality of cells, each cell having sides bounded by inner and outer surfaces and being of a size and configuration designed to hold therein a fuel assembly, each said cell being positioned in a corresponding pair of said aligned polygonal openings, each said cell being open at both ends with a guiding funnel at its upper end, and said cells being positioned over said flow openings in said base-plate means, thereby to permit flow of coolant through said cells;

spaced outwardly directed projections on said outer surfaces of the sides of said cells near the tops and bottoms of the sides thereof, each said cell together with said projections thereon being sized to be received with a corresponding said pair of aligned polygonal openings in which said each cell is respectively positioned;

means fixedly securing said projections to the beams in the first and second networks of beams thereby to provide a substantially rigid fuel rack of modular design;

neutron absorbing material mounted on the outer surfaces of the sides of said cells, said neutron absorbing material comprising sheet material covering substantially the full surface area of each side of each said cell, each said sheet on each side of each cell being enclosed on a wrapper plate, said plate being larger than said sheets and having its end edges bonded to the cell surfaces, said nuclear fuel rack also including means, associated with each cell, for providing a continuous structural support for said sheet material between said spaced top and bottom projections; and leveling means for said base structure located between the fuel storage pool floor and said base structure for adjusting the base-plate means and cells thereon to a level condition.

17. The nuclear fuel rack according to claim 16 wherein each neutron absorber sheet material terminates short of the side edges of each cell and is substantially the same length as the active portion of a fuel assembly adapted for positioning in the cell.

18. A fuel rack for use in storing nuclear fuel assemblies in a nuclear fuel storage pool having a floor, the said fuel rack comprising:

a base structure at the lower end of the fuel rack including base-plate means having flow openings therein, said base-plate means supporting a first network of interlaced beams which form a multiplicity of polygonal openings, a second network of interlaced beams forming polygonal openings positioned in spaced vertical alignment with corresponding polygonal openings in the first network of beams;

a plurality of cells, each cell having sides bounded by inner and outer surfaces and being of a size and configuration designed to hold therein a fuel assembly, each said cell being positioned in a corresponding pair of corresponding said aligned polygonal openings, each said cell being open at both ends, and said cells being positioned over said flow openings in said baseplate means, thereby to permit flow of coolant through said cells;

spaced, outwardly directed, projections on said outer surfaces of the sides of said cells near the tops and bottoms of the sides thereof, said cells together with said projections thereon being sized to be received within said pair of corresponding aligned polygonal openings in which said cells are respectively positioned; and means fixedly securing said projections to the beams in the first and second networks of beams thereby to provide a substantially rigid fuel rack of modular design;

neutron absorbing material mounted on the outer surfaces of the sides of at least some of said cells between said spaced top and bottom projections, said neutron absorbing material having a thickness no greater than the outward extent of said projections; and leveling means for said base structure, located between the fuel storage pool floor and said base structure, for adjusting the base-plate and the cells thereon to a level condition; said leveling means for the base structure including:

multiple leveling pads beneath said base structure, each of said pads including a base member having vertically adjustable means therein arranged to engage the underside of said base structure and thereby provide, upon adjustment, a horizontal surface to help ensure vertical alignment of the cells, said vertically adjustable means including a frame having upstanding arms which engage the underside of the base structure and an adjustable foot arranged to coact with said frame to adjust vertically the base structure to assure vertical alignment of the cell walls, said frame having a central opening and said adjustable foot being screw threaded into said opening so that when said foot is adjusted vertically, said frame and frame arms move relative to the pool floor to achieve leveling of the base structure also to assure vertical alignment of the cell walls.

19. A free-standing fuel rack for storing nuclear fuel assemblies in a nuclear fuel-storage pool; said fuel rack comprising:

a base structure at the lower end of the fuel rack including base-plate means having flow openings therein, said baseplate means supporting a first grid network of interlaced beams which form a multiplicity of polygonal openings;

a second grid network of interlaced beams vertically spaced from said first network and forming polygonal openings positioned in spaced vertical alignment with corresponding polygonal openings in the first network of beams;

a plurality of cells, each cell having sides bounded by inner and outer surfaces and being of a size and configuration designed to hold therein a fuel assembly, said sides of each said cell in transverse cross section forming a polygonal shape geometrically similar to the shape of said polygonal openings formed by said interlaced grid networks of beams, each said cell being positioned in a corresponding pair of said aligned polygonal openings over said flow openings in said base-plate means thereby to permit flow of coolant through said cell;

spaced outwardly directed projections on said outer surfaces of all sides of each said cell near the tops and bottoms of the sides thereof, each said cell together with said projections thereon being sized to be received within a corresponding of said pair of aligned polygonal openings in which said each cell is positioned; and means fixedly securing said projections on each cell on all sides to the adjacent beams defining the openings through which said each cell passes.

20. The free-standing fuel rack according to claim 19 wherein neutron absorbing material is mounted on the outer surfaces of the sides of at least some of the cells between the spaced top and bottom projections, said neutron absorbing material having a thickness no greater than the outward extent of said projections.

21. The free-standing nuclear fuel rack according to claim 19 characterized by that the neutron absorber material comprises sheet material which covers substantially the full surface area of each side of each cell and further characterized by means, associated with each cell, for providing a structural support for said material.

22. A free-standing fuel rack for storing nuclear fuel assemblies in a nuclear fuel-storage pool; said fuel rack comprising:

a base structure at the lower end of the fuel rack including base-plate means having flow openings therein, said base-plate means supporting a first grid network of interlaced beams which form a multiplicity of polygonal openings;

a second grid network of interlaced beams vertically spaced from said first network and forming a polygonal opening positioned in spaced vertical alignment with corresponding polygonal openings in the first network of beams;

a plurality of cells, each cell having sides bounded by inner and outer surfaces and being of a size and configuration designed to hold therein a fuel assembly, said sides of each said cell in transverse cross section forming a polygonal shape geometrically similar to the shape of said polygonal openings formed by said interlaced grid networks of beams, each said cell being positioned in a corresponding pair of said aligned polygonal openings over said flow openings in said base-plate means thereby to permit flow of coolant through said cells; and means fixedly securing each said cell on all sides to the adjacent beams both in the first and second grid networks, which adjacent beams define the openings through which said each cell passes.

23. The free-standing fuel rack of claim 22 wherein the polygonal openings along the periphery of said fuel rack, both in the first and second grid networks, have open gaps characterized by that said fuel rack includes upper and lower side plates extending along the periphery of said rack, across said open gaps and further characterized by means for fixedly securing each cell to the parts of the side plates extending across the gaps of the peripheral polygonal openings through which said each cell passes.

* * * * *